US008257782B2

(12) United States Patent
Perego et al.

(10) Patent No.: US 8,257,782 B2
(45) Date of Patent: Sep. 4, 2012

(54) ELECTRICAL CABLE FOR HIGH VOLTAGE DIRECT CURRENT TRANSMISSION, AND INSULATING COMPOSITION

(75) Inventors: Gabriele Perego, Milan (IT); Enrico Albizzati, Lesa (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 0 days.

(21) Appl. No.: 10/343,515

(22) PCT Filed: Jul. 12, 2001

(86) PCT No.: PCT/EP01/08084

§ 371 (c)(1), (2), (4) Date: Aug. 21, 2003

(87) PCT Pub. No.: WO02/11154

PCT Pub. Date: Feb. 7, 2002

(65) Prior Publication Data

US 2004/0029013 A1 Feb. 12, 2004

Related U.S. Application Data

(60) Provisional application No. 60/223,476, filed on Aug. 7, 2000.

(30) Foreign Application Priority Data

Aug. 2, 2000 (EP) .................................... 00116643

(51) Int. Cl.

| | |
|---|---|
| ***H01B 13/24*** | (2006.01) |
| ***B05D 7/20*** | (2006.01) |
| *B32B 15/02* | (2006.01) |

(52) U.S. Cl. ........ 427/118; 427/117; 428/372; 428/375; 428/379; 428/383; 174/102 R; 174/102 SC; 174/120 SC

(58) Field of Classification Search .................. 428/375, 428/379, 383, 384, 372; 174/110 PM, 110 R, 174/DIG. 13

See application file for complete search history.

(56) References Cited

U.S. PATENT DOCUMENTS

| | | | | | |
|---|---|---|---|---|---|
| 3,617,377 | A | * | 11/1971 | Isshiki et al. | 428/368 |
| 3,862,265 | A | * | 1/1975 | Steinkamp et al. | 525/285 |
| 4,015,049 | A | * | 3/1977 | Yoda et al. | 428/461 |
| 4,206,260 | A | * | 6/1980 | McMahon | 428/379 |
| 4,305,849 | A | * | 12/1981 | Kawasaki et al. | 252/567 |

(Continued)

FOREIGN PATENT DOCUMENTS

EP 300401 * 1/1989

(Continued)

OTHER PUBLICATIONS

Liu, et al., "Graft Copolymerization of Oleic Acid onto Low-Density Polyethylene in the Molten State", 2003, Journal of App. Polymer Science. vol. 90, pp. 3299-3304.*

(Continued)

*Primary Examiner* — Jill Gray

(74) *Attorney, Agent, or Firm* — Finnegan, Henderson, Farabow, Garrett & Dunner, L.L.P.

(57) ABSTRACT

Cable for high voltage direct current transmission having at least one conductor and at least one extruded insulating layer consisting of a polymeric composition of a polyethylene and at least one unsaturated fatty acid. Insulating composition having a polyethylene and at least one unsaturated fatty acid.

6 Claims, 1 Drawing Sheet

U.S. PATENT DOCUMENTS

| | | | | | |
|---|---|---|---|---|---|
| 4,370,517 | A * | 1/1983 | Soma et al. | ................. | 174/74 R |
| 4,400,429 | A * | 8/1983 | Barlow et al. | ................. | 428/379 |
| 4,499,013 | A * | 2/1985 | Barlow et al. | ................. | 252/567 |
| 4,543,381 | A * | 9/1985 | Barlow et al. | ................. | 524/188 |
| 4,588,794 | A * | 5/1986 | Oda et al. | ................... | 526/169.2 |
| 4,729,854 | A * | 3/1988 | Miyata et al. | ................. | 252/609 |
| 4,845,146 | A * | 7/1989 | Inoue et al. | ................... | 524/436 |
| 4,869,848 | A * | 9/1989 | Hasegawa et al. | ............ | 252/609 |
| 4,909,960 | A * | 3/1990 | Watanabe et al. | ............. | 252/511 |
| 5,177,138 | A * | 1/1993 | Moriyama et al. | ............ | 524/437 |
| 5,216,058 | A * | 6/1993 | Visneski | ....................... | 524/357 |
| 5,218,027 | A * | 6/1993 | Smith et al. | ................... | 524/265 |
| 5,420,185 | A * | 5/1995 | Watanabe et al. | ............. | 524/210 |
| 6,063,845 | A * | 5/2000 | Nylander | ....................... | 524/284 |
| 6,395,975 | B1 * | 5/2002 | Bosisio et al. | .............. | 174/25 R |
| 6,410,651 | B1 * | 6/2002 | Castellani et al. | ............ | 525/232 |
| 6,509,527 | B2 * | 1/2003 | Gadessaud et al. | ....... | 174/120 R |
| 6,515,231 | B1 * | 2/2003 | Strøbech et al. | .......... | 174/137 B |
| 6,756,447 | B2 * | 6/2004 | Castellani et al. | ............ | 525/232 |
| 2001/0030053 | A1 * | 10/2001 | Gadessaud et al. | ..... | 174/102 SC |
| 2004/0029013 | A1 * | 2/2004 | Perego et al. | ................. | 429/233 |

FOREIGN PATENT DOCUMENTS

| | | | |
|---|---|---|---|
| EP | 0 374 596 | | 6/1990 |
| EP | 0 463 402 | A2 | 1/1992 |
| EP | 0 472 035 | A2 | 6/1992 |
| EP | 0 871 181 | A1 | 10/1998 |
| JP | 01108241 | A * | 4/1989 |
| JP | 2-10610 | | 1/1990 |
| JP | 04311744 | A * | 11/1992 |
| JP | 04322009 | A * | 11/1992 |
| JP | 6-215645 | | 8/1994 |
| JP | 08283352 | A * | 10/1996 |
| JP | 409236734 | A * | 9/1997 |
| JP | 10-283851 | | 10/1998 |
| JP | 02001264601 | A * | 9/2001 |
| WO | WO98/52197 | | 11/1998 |
| WO | WO99/19924 | | 4/1999 |
| WO | WO99/40589 | | 8/1999 |
| WO | WO 99/44207 | | 9/1999 |
| WO | WO99/44207 | | 9/1999 |
| WO | WO00/08655 | | 2/2000 |

OTHER PUBLICATIONS

Uncertified translation of JP2-10610, Jan. 16, 1990.

* cited by examiner

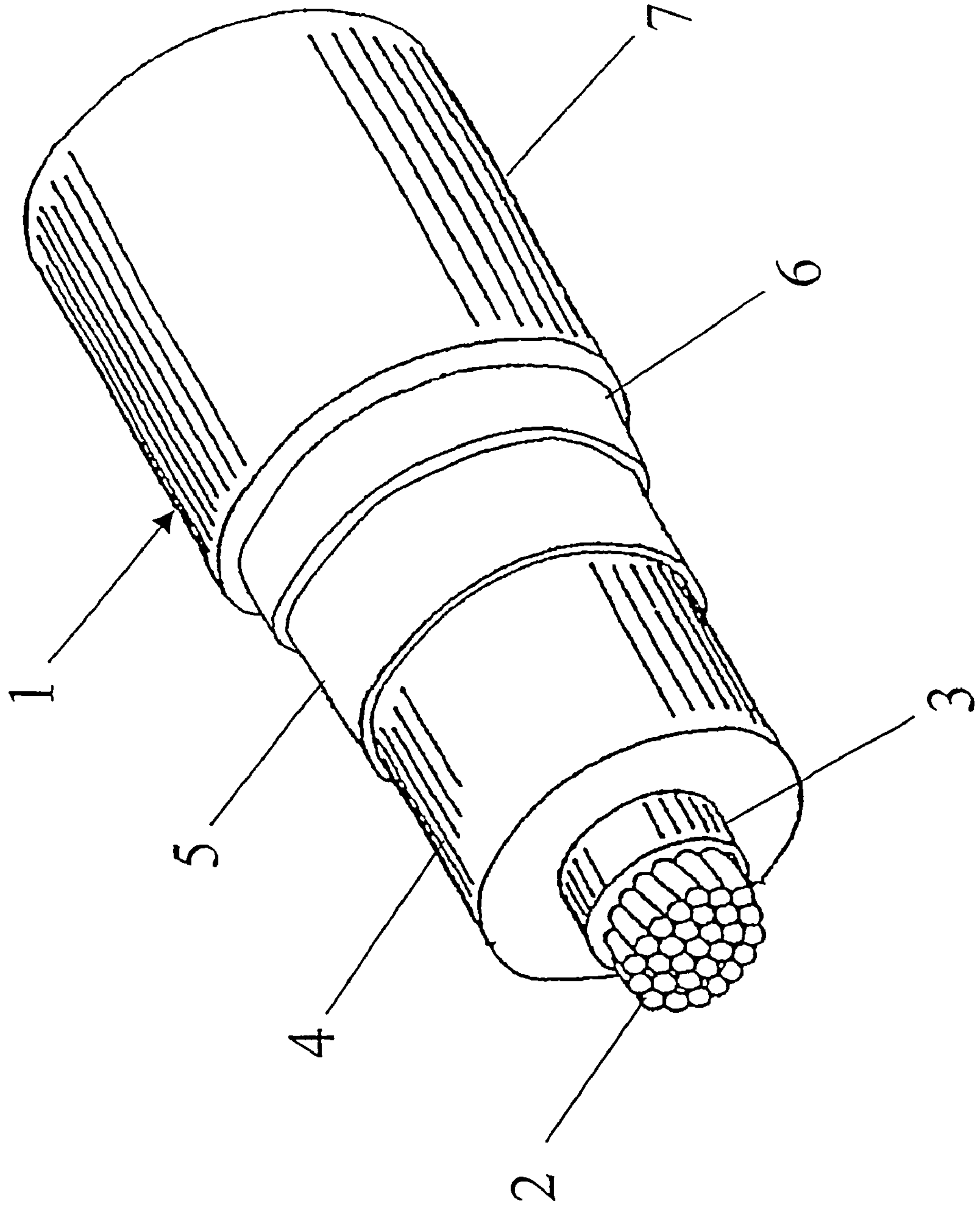
1
2
3
4
5
6
7

ELECTRICAL CABLE FOR HIGH VOLTAGE DIRECT CURRENT TRANSMISSION, AND INSULATING COMPOSITION

CROSS REFERENCE TO RELATED APPLICATIONS

This application is a national phase application based on PCT/EP01/08084, filed Jul. 12, 2001, the content of which is incorporated herein by reference, and claims the priority of European Patent Application No. 00116643.8, filed Aug. 2, 2000, the content of which is incorporated herein by reference, and claims the benefit of U.S. Provisional Application No. 60/223,476, filed Aug. 7, 2000, the content of which is incorporated herein by reference.

BACKGROUND OF THE INVENTION

1. Field of the Invention

The present invention relates to a cable for high voltage direct current transmission, and to the insulating composition used therein.

More particularly, the present invention relates to a cable for high voltage direct current transmission, suitable for either terrestrial or submarine installations, comprising a conductor and an extruded insulating layer consisting of a polymer composition comprising a polyethylene and at least one unsaturated fatty acid.

The present invention also relates to an insulating composition comprising a polyethylene and at least one unsaturated fatty acid.

In the present description and in the claims, the term "high voltage" denotes a voltage in excess of 35 kV.

2. Description of the Related Art

For high voltage direct current transmission, either along terrestrial lines or, in particular, along submarine lines, use is generally made of cables commonly known in the art as mass-impregnated cables, in which the conductor, covered with a first semiconducting layer, is electrically insulated by taping with an insulating material, generally paper or paper-polypropylene-paper multi-layer laminates, which is then thoroughly impregnated with a mixture having high electrical resistivity and high viscosity, generally a hydrocarbon oil to which a viscosity-increasing agent has been added. The cable additionally comprises a further semiconducting layer and a metal screen, generally made from lead, which in turn is surrounded by at least one metal armouring structure and by one or more protective sheaths of plastic material.

Mass impregnated cables, although characterized by high reliability in operation even with very high voltages (in excess of 150 kV) have certain drawbacks, principally related to the migration of insulating fluid within the cable. In particular, when in use the cable is subjected, owing to variations in the intensity of the current carried, to thermal cycles which cause migrations of the fluid in the radial direction. This is because, when the current carried increases and the cable heats up, the viscosity of the insulating fluid decreases and the fluid is subjected to a thermal expansion greater than that of all the other elements of the cable. This results in a migration of the fluid from the insulating layer towards the exterior, and consequently an increase of the pressure exerted on the metal screen which is deformed in the radial direction. When the current carried decreases and the cable cools, the impregnating fluid contracts, while the metal screen, being constituted by a plastic material (usually lead), remains permanently deformed. Thus a decrease of the pressure within the cable is caused, and this leads to the formation of micro-cavities in the insulating layer, with a consequent risk of electrical discharges and therefore of perforation of the insulation. The risk of perforation increases with an increase in the thickness of the insulating layer, and therefore with an increase in the maximum voltage for which the cable has been designed.

Another solution for high voltage direct current transmission consists in the use of fluid oil cables, in which the insulation is provided by a pressurized oil with low viscosity and high electrical resistivity which is (under hydrostatic head). Although this solution is highly effective in preventing the formation of micro-cavities in the cable insulation, it has various drawbacks, mainly related to the complexity of construction and, in particular, it imposes a limitation on the maximum permissible length of the cable. This limitation on the maximum length is a major drawback, particularly in the case of use in submarine installations, where the lengths required are usually very great.

For many years, research has been directed towards the possibility of using cross-linked polyolefins, and, particularly, cross-linked polyethylene (XLPE), to produce insulating materials for cables for direct current transmission. Insulating materials of this type are already widely used in cables for alternating current transmission. The use of said insulating materials also in the case of cables for direct current transmission would allow the said cables to be used at higher temperatures, for example at 90° C. instead of 50° C., than those at which the previously described mass impregnated cables can be used (higher operating temperatures allow the quantity of current transported to be increased), and would also remove the limitations on the maximum permissible length of the cable, by contrast with the case of the fluid oil cables described above.

However, it has not yet been possible to make adequate and complete use of said insulating materials, particularly for direct current transmission. The common view is that one of the main reasons for this limitation is the development and accumulation of what are called space charges in the dielectric insulating material when the said material is subjected to direct current. It is considered that the space charges alter the distribution of the electrical field and persist for long periods because of the high resistivity of the polymers used. The accumulation of the space charges leads to a local increase of the electrical field which consequently comes to be greater than that which would be expected on the basis of the geometrical dimensions and dielectric characteristics of the insulating material.

The accumulation of the space charges is a slow process: however, the problem is accentuated if the direct current transported by the cable is reversed (in other words, if there is a reversal of polarity). As a result of this reversal, a capacitive field is superimposed on the overall electrical field and the value of the maximum gradient can be localized within the insulating material.

It is known that a prolonged degassing treatment which can be carried out, for example, by subjecting the insulating material based on a cross-linked polymer to high temperatures and/or to a high vacuum for a long period, can be used to obtain an insulating material capable of limiting the accumulation of the space charges when the cable is subjected to polarity reversal. In general, it is believed that the said degassing treatment reduces the formation of the space charges as a result of the removal of the decomposition products of the crosslinking agent (for example, dicumyl peroxide, which decomposes to form acetophenone and cumyl alcohol) from the insulating material. However, a prolonged degassing treatment evidently leads to an increase in production times and costs.

There is a known way of attempting to reduce the accumulation of space charges by modifying the crosslinked polyethylene (XLPE) by introducing small quantities of polar groups.

For example, Japanese patent application JP-A210610 describes a cross-linked polyethylene, modified by grafting maleic anhydride in a quantity of between 0.02% and 0.5% by weight, which would be usable as an insulating material for cables for direct current transmission, since it would be capable of trapping the space charges and thus reducing their accumulation.

Japanese patent application JP 10/283,851 describes a cable for direct current transmission with improved dielectric strength in the presence of polarity reversals or following the applications of electrical pulses, in which the insulating layer consists of a polymeric composition comprising a cross-linked polyolefin containing (i) a dicarboxylic acid anhydride and (ii) at least one monomer containing a polar group (chosen from at least one carbonyl, nitrile or nitro group). However, this requires the presence of a particular peroxide, more precisely 2,5-dimethyl-2,5-di(t-butyl peroxy)hexane, and of a particular antioxidant, more precisely an ester of a thiocarboxylic acid.

Patent application EP 0 463 402 describes an ethylene (co)polymer containing polar groups chosen from ketone, nitrile and nitro groups in quantities ranging from 20 ppm to 8000 ppm, the said polar groups having a dipole moment of more than 0.8 debye. The said (co)polymer would be usable as an insulating material for high-voltage cables having an improved dielectric strength.

Patent application WO 99/405589 relates to a cable for direct current transmission in which the insulating layer consists of cross-linked polyethylene comprising polar groups obtained by pretreatment of the polyethylene with molecular oxygen before extrusion.

Patent application WO 99/44207 relates to a cable for direct current transmission in which the insulating layer consists of a polymeric composition based on cross-linked polyethylene modified by polar groups. The said polar groups, having the general formula:

$$CH_2{=}CR{-}CO{-}X{-}(CH_2)_n{-}N(CH_3)_2 \text{ or}$$
$$CH_2{=}CR{-}CO{-}O{-}(CH_2{-}CH_2O)_n{-}H,$$

in which n is 2 or 3, m is a number ranging from 1 to 20, R is H or $CH_3$, and X is O or NH, are introduced into the cross-linked polyethylene by copolymerization or grafting. Examples of the said polar groups are dialkyl-aminopropyl-(met)acrylamide or (oligo)-ethyleneglycol-methacrylate.

Japanese patent application JP 06/215645 describes a cable for high voltage direct current transmission with reduced accumulation of space charges. The insulating layer is made by hot crosslinking of a mixture of polyethylene, an organic peroxide having a half-life time of more than 5 hours at 130° C., and an acid chosen from itaconic acid and crotonic acid in a quantity of less than 5 parts by weight per 100 parts by weight of polyethylene.

Patent application WO 00/08655 relates to a cable for direct current transmission in which the insulating layer consists of a polymeric composition based on polyethylene to which an esterified (poly)glycerol having at least two free OH groups is added.

SUMMARY OF THE INVENTION

The Applicant has now found that it is possible to decrease the local accumulation of space charges in the insulating layer of a cable for high voltage direct current transmission by using as the insulating layer a polymeric composition comprising a polyethylene and at least one unsaturated fatty acid. In addition to being graftable onto the polyethylene chain, the unsaturated fatty acid is highly compatible with polyethylene and easily dispersible in it: consequently, the cable insulated in this way is capable of providing better electrical performances when used for high voltage direct current transmission, particularly in the presence of polarity reversals.

In a first aspect, the present invention therefore relates to a cable for high voltage direct current transmission, comprising at least one conductor and at least one extruded insulating layer consisting of a polymeric composition comprising a polyethylene and at least one unsaturated fatty acid.

In a second aspect, the present invention relates to an insulating composition comprising a polyethylene and at least one unsaturated fatty acid.

In a further aspect, the present invention relates to a method for reducing the accumulation of space charges in an electrical cable for high voltage direct current transmission, comprising at least one conductor and at least one extruded insulating layer consisting of a polymeric composition comprising a polyethylene, characterized in that at least one unsaturated fatty acid is added to said polymeric composition.

In a preferred embodiment, the polyethylene (PE) is a homopolymer of ethylene or a copolymer of ethylene with at least one α-olefin having a density in the range from 0.860 g/cm$^3$ to 0.970 g/cm$^3$, and preferably from 0.865 g/cm$^3$ to 0.940 g/cm$^3$.

In the present description and in the claims, the term "α-olefin" denotes an olefin having the general formula $CH_2{=}CH{-}R$, in which R represents an alkyl group having 1 to 10 carbon atoms, linear or branched. The α-olefin can be chosen, for example, from: propylene, 1-butene, 1-pentene, 4-methyl-lpentene, 1-hexene, 1-octene, 1-dodecene, and the like. Of these, 1-butene, 1-hexene and 1-octene are preferred.

Preferably, the polyethylene is chosen from the following: high-density polyethylene (HDPE) having a density of at least 0.940 g/cm$^3$, preferably a density in the range from 0.940 g/cm$^3$ to 0.960 g/cm$^3$; medium-density polyethylene (MDPE) having a density in the range from 0.926 g/cm$^3$ to 0.940 g/cm$^3$; low-density polyethylene (LDPE) and linear low-density polyethylene (LLDPE) having a density in the range from 0.910 g/cm$^3$ to 0.926 g/cm$^3$.

In a preferred embodiment, the unsaturated fatty acid has from 10 to 26, preferably from 14 to 22, carbon atoms.

Examples of unsaturated fatty acids which can be used according to the present invention are: myristoleic acid, palmitoleic acid, oleic acid, gadoleic acid, erucic acid, ricinoleic acid, linoleic acid, linolenic acid, arachidonic acid, and the like, or mixtures thereof. Oleic acid is particularly preferred.

The unsaturated fatty acids usable according to the present invention can be used in mixtures with saturated fatty acids. Examples of saturated fatty acids which may be present in the mixture are: lauric acid, myristic acid, palmitic acid, stearic acid, behenic acid, and the like, or mixtures thereof.

The insulating composition which can be used according to the present invention is not crosslinked, or, preferably, is cross-linked.

If cross-linking is carried out, said crosslinking takes place via radicals by thermal decomposition of a radical initiator, usually an organic peroxide such as dicumyl peroxide, t-butyl cumyl peroxide, 2,5-dimethyl-2,5-di(t-butyl peroxy)hexane, or di-t-butyl peroxide, which is made to be absorbed by the polyethylene before extrusion or injected directly into the extruder. The quantity of radical initiator used is generally in the range from 0.1 to 5 parts per 100 parts by weight of the composition.

In this case, the temperature of extrusion of the material which forms the insulating layer is kept below the decomposition temperature of the peroxide used. For example, when dicumyl peroxide is used, the temperature of the extruder is kept at approximately 130° C. to prevent pre-crosslinking of the insulating material, and the cross-linking process is carried out at a temperature in the range from 180° C. to 280° C.

If cross-linking is carried out, at least part of the unsaturated fatty acid is grafted onto the polyethylene. It should be noted that the presence of unsaturated fatty acid not grafted onto the polyethylene, by contrast with other graftable monomers whose ungrafted excess is usually eliminated by degassing, does not adversely affect the final performance of the cable.

The addition of the unsaturated fatty acid can be carried out either by its absorption on polyethylene granules or powder before the extrusion or, preferably, by its injection and mixing with the melted polyethylene during the extrusion.

The quantity of fatty acid present in the insulating composition is generally in the range from 0.01% to 0.5%, preferably from 0.05% to 0.3%, said quantity being expressed as the content by weight of —COOH groups with respect to the overall weight of the polymeric composition.

The insulating composition described above can optionally comprise an efficacious quantity of one or more conventional additives, such as antioxidants, processing adjuvants, lubricants, pigments, water-tree retardants, voltage stabilizers, antiscorching agents, and the like.

Antioxidants generally useful for this purpose are: 4,4'-thio-bis(6-t-butyl-m-cresol) (known commercially under the tradename Santonox® TBMC, produced by Flexsys), tetrakis [3-(3,5-di-t-butyl-4-hydroxyphenyl)propionyloxymethyl] methane (known commercially under the tradename Irganox® 1010, produced by CIBA), 2,2'-thio-bis(4-methyl-6-t-butylphenol) (known commercially under the tradename Irganox® 1081, produced by CIBA), 2,2'-thiodiethylene bis [3-(3,5-di-t-butyl-4-hydroxyphenyl)propionate] (known commercially under the tradename Irganox® 1035, produced by CIBA), and thiocarboxylic acids esters, or mixtures of thereof.

BRIEF DESCRIPTION OF THE DRAWING

The attached FIG. 1 shows an embodiment of the cable according to the present invention, and, in particular, shows in a perspective view a section of cable with portions partially removed to show its structure.

DETAILED DESCRIPTION OF THE INVENTION

With reference to FIG. 1, the cable 1 according to the present invention comprises, in sequence from the centre to the exterior: a conductor 2, an inner semiconducting layer 3, an insulating layer 4, an outer semiconducting layer 5, a metal screen 6, and an outer sheath 7.

The conductor 2 generally consists of metal wires, preferably made from copper or aluminium, stranded together by conventional methods. The inner and outer semiconducting layers 3 and 5, generally consisting of a polyolefin-based polymeric composition containing a conductive filler (carbon black for example), are extruded onto the conductor 2, separately or simultaneously with the insulating layer 4 according to the present invention. A screen 6, generally consisting of spirally wound electrically conducting wires or tapes, is usually positioned around the outer semiconducting layer 5. This screen is then covered with a sheath 7, consisting of a thermoplastic material, for example non-cross-linked polyethylene (PE), or, preferably, a homopolymer or copolymer of propylene.

The cable can also be provided with an outer protective structure (not shown in FIG. 1) whose principal function is to mechanically protect the cable against impact and/or compression. This protective structure can be, for example, a metal armour or a layer of expanded polymeric material as described in patent application WO 98/52197.

FIG. 1 shows only one possible embodiment of a cable according to the present invention: clearly, modifications known in the art can be made to this embodiment without thereby departing from the scope of the present invention.

The cable according to the present invention can be made according to known techniques for the deposition of layers of thermoplastic material, for example by means of extrusion. Advantageously, the extrusion is carried out in a single pass, for example by means of a "tandem" technique, in which individual extruders arranged in series are used, or by co-extrusion by means of a multiple extrusion head.

The present invention will now be described further in the following example which is provided solely for the purpose of illustration and is not to be considered as limiting the invention in any way.

EXAMPLE 1

99.5 g of low-density polyethylene (LDPE LE 4210 S, produced by Borealis), containing 2.1% by weight of dicumyl peroxide (99% purity), and 0.7 g of oleic acid (Aldrich) were placed in a 200 ml flask, and the whole was stirred continuously.

The temperature was then raised to 50° C. and the mixture was kept at this temperature, with stirring, for three hours, until the oleic acid had been completely absorbed.

Films by press moulding at 130° C. and subsequent cross-linking at 180° C. were prepared from the mixture so obtained.

The moulding conditions were as follows:

press dimensions: 20×20 cm;
pressure: 170 bar;
quantity of material: 4.5 g;
thermoforming temperature: 130° C.;
duration of thermoforming: 5 mins.;
cross-linking temperature: 180° C.;
duration of cross-linking: 30 mins.;
cooling time: 30 mins.

The films produced as described above had dimensions of 20×20 cm and a thickness of approximately 120 μm.

Test specimens having dimensions of 7×7 cm were cut from the aforesaid films and were subjected to an electrical ageing test in the presence of polarity reversal: the results are shown in Table 1. For comparison, test specimens with the same polyethylene without the addition of oleic acid were produced as stated above.

The test was conducted as follows.

The aforesaid test specimens were placed between two steel electrodes having a Rogowski profiles.

The electrodes were immersed in a silicone oil in order to prevent external discharges during the test, and a direct current electrical field of 20 kV with positive polarity was applied. After 1 hour, the polarity was reversed, and the test was continued in this way for 6 hours.

The test was repeated with the electrical field increased to 25 kV and with the polarity reversed every hour, for 6 hours, as described above.

The lifetimes equivalent to a voltage gradient of 216 kV/mm were calculated from the data obtained from the tests conducted on 8 test specimens, by carrying out a Weibull calculation on the said data, assuming a life n equal to 12: the results are shown in Table 1.

TABLE 1

| MATERIAL | LIFETIME AT 216 kV/mm (hours) |
|---|---|
| XLPE | 1.20 |
| XLPE-g-OA* | 35.00 |

*OA: oleic acid.

What is claimed is:

1. A method for reducing the accumulation of space charges in an electrical cable for high voltage direct current transmission comprising;

extruding at least one insulating layer comprising an insulating polymeric composition comprising a polyethylene grafted with at least one unsaturated fatty acid thereby reducing the accumulation of space charges in said cable, wherein said electrical cable comprises at least one conductor, at least one semiconducting layer, and said at least one insulating layer.

2. The method according to claim 1, wherein the polyethylene is a homopolymer of ethylene or a copolymer of ethylene with at least one α-olefin, having a density in the range from 0.860 g/cm$^3$ to 0.970 g/cm$^3$.

3. The method according to claim 2, wherein the α-olefin is an olefin having the general formula $CH_2{=}CH{-}R$, wherein R represents an alkyl group having 1 to 10 carbon atoms, linear or branched.

4. The method according to claim 3, wherein the α-olefin is chosen from: propylene, 1-butene, 1-pentene, 4-methyl-1-pentene, 1-hexene, 1-octene, and 1-dodecene.

5. The method according to claim 1, wherein the polyethylene is chosen from the following: high-density polyethylene having a density of at least 0.940 g/cm$^3$; medium-density polyethylene having a density in the range from 0.926 g/cm$^3$ to 0.940 g/cm$^3$; and low density polyethylene and linear low-density polyethylene having a density in the range from 0.9 10 g/cm$^3$ to 0.926 g/cm$^3$.

6. The method according to claim 1, wherein the unsaturated fatty acid is oleic acid.

* * * * *